United States Patent [19]
Britton

[11] Patent Number: 4,791,347
[45] Date of Patent: Dec. 13, 1988

[54] ELECTRICAL POWER SUPPLY

[76] Inventor: Martin T. Britton, 1 Beaverdyke, Clifton, York, England, YO3 6ZG

[21] Appl. No.: 933,016

[22] Filed: Nov. 20, 1986

[30] Foreign Application Priority Data

Feb. 3, 1986 [GB] United Kingdom ................. 8602577

[51] Int. Cl.$^4$ ...................... H02J 7/00; H01M 10/46; H01M 2/26
[52] U.S. Cl. ........................................ 320/2; 320/16; 429/121
[58] Field of Search ........................................ 320/2-5, 320/15-18, 37, 38; 429/121, 178

[56] References Cited

U.S. PATENT DOCUMENTS

| | | | |
|---|---|---|---|
| 2,978,596 | 4/1961 | Robirds | 320/2 X |
| 2,991,376 | 7/1961 | Sherwood et al. | 320/38 X |
| 3,536,051 | 10/1970 | Hamman | 123/179 |
| 3,763,415 | 10/1973 | Ownby | 320/16 X |
| 3,963,972 | 6/1976 | Todd | 320/2 |
| 4,004,208 | 1/1977 | Tamminen | 320/2 |
| 4,161,682 | 7/1979 | Corvette | 320/2 |
| 4,321,522 | 3/1982 | Matsunaga | 320/2 |
| 4,350,746 | 9/1982 | Chambers | 429/178 X |
| 4,511,637 | 4/1985 | Evans | 429/121 X |
| 4,540,929 | 9/1985 | Binkley | 320/16 X |

FOREIGN PATENT DOCUMENTS

| | | |
|---|---|---|
| 1358056 | 6/1974 | United Kingdom . |
| 1448053 | 9/1976 | United Kingdom . |

Primary Examiner—R. J. Hickey
Attorney, Agent, or Firm—Kinney & Lange

[57] ABSTRACT

An auxiliary power supply for augmenting the power provided by the battery of an automobile, which contains a single battery mounted in an outer housing to form a self contained supply, and which includes a charger circuit within the housing that is connected to the battery in the housing to effect charging at desired intervals. The housing carries connections for input power, and for output power. In the specific form shown the housing carries arms that are connectable to the terminals of a battery to be augmented and which are arranged to engage directly onto the terminal post of such an automobile battery.

15 Claims, 3 Drawing Sheets

1

ELECTRICAL POWER SUPPLY

This invention relates to an electrical power supply, and particularly to an electrical power supply for use in augmenting the supply provided by a battery of an automobile having an electrical starter motor, at the time of starting the automobile.

It often occurs, particularly in the winter, that an automobile's battery is unable to provide sufficient power to start the automobile's engine, it then being necessary either to wait while the battery is recharged, or to use so-called jump leads by which the battery is connected to the battery of another automobile able to supply the necessary power. Delay is not always convenient, and the use of jump leads is often awkward, can be dangerous, and requires a willing provider of another automobile.

According to this invention there is provided an electrical power supply, for use in augmenting the supply provided by a battery of an automobile having an electrical starter motor, at the time of starting the automobile, comprising a housing; a battery mounted in the housing; a battery charger circuit arrangement mounted in the housing and connectible to the battery in the housing to effect charging thereof; power input means accessible to the exterior of the housing and by way of which electrical power can be supplied to the battery charger circuit arrangement; and power output means by which the battery in the housing can be connected to the battery of an automobile to augment the power thereof.

The power supply of this invention has the advantages that it provides a portable source of power which can be carried in an automobile for use when necessary and which can be recharged at leisure, for example, when the automobile is not in use.

Preferably the power output means comprises a pair of arms adapted and arranged to engage directly terminal posts of an automobile battery.

Such a power supply has the advantage that it can simply and easily be directly engaged with an automobile's battery without the need to use any form of trailing leads.

The arms can be of variable length whereby they can engage the terminal posts of automobile batteries having terminal posts spaced from each other by distances within a predetermined range of distances.

This invention will now be described by way of example with reference to the drawings, in which.

Figure 1:
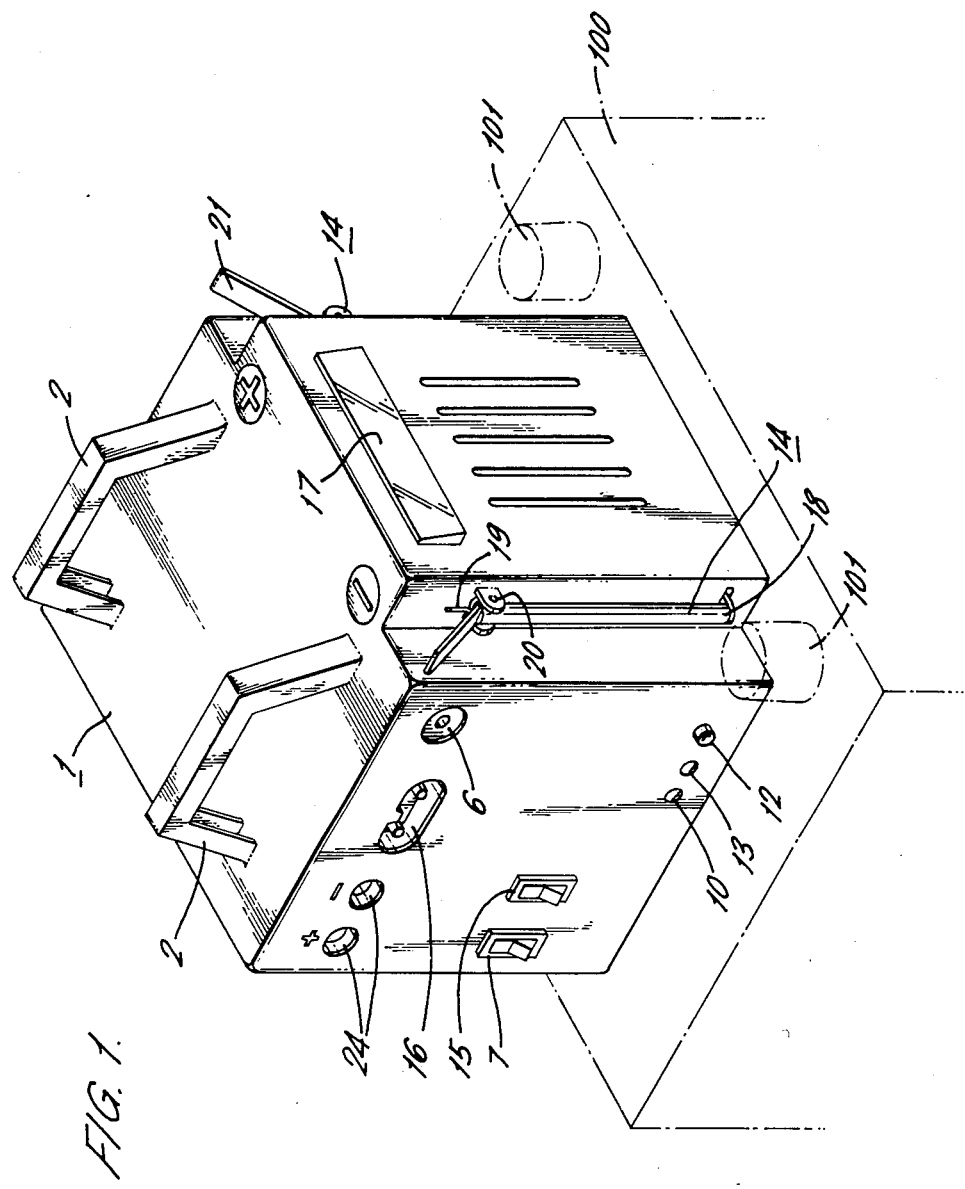
FIG. 1 is a perspective view of one embodiment of a power supply according to the invention.

Referring now to the drawings, the power supply comprises a housing 1 moulded from snythetic plastics material and having handles 2 by which the power supply can be carried.

The housing 1 contains a sealed lead acid battery 3 of 20 AH rating, and a battery charger circuit arrangement 4.

The battery charger circuit arrangement 4 can be energised by way of power input means accessible to the exterior of the housing 1, and comprising a mains power input 5 (not visible in FIG. 1) and a socket 6 by which the power supply can be connected to a power outlet on an automobile, for example to a cigar lighter socket. The mains power supply 5 is controlled by an illuminated switch 7 mounted on the housing 1.

Associated with the battery charger circuit arrangement 4 in the housing 1 are a timer circuit arrangment 8 operative to control a transistor switch 9 in the arrangement 4 to make and break the connection between the power supply portion of the arrangement 4 and the charging portion of the arrangement 4, the switch 9 breaking the connection when the battery 3 is charged. The arrangement 8 includes a light emitting diode 10 operative to indicate the end of charging of the battery 3.

Also contained in the housing 1 is a test circuit arrangement 11 including a test switch 12 in the form of a push button operation of which causes lighting of a further light emitting diode 13 to indicate that the battery 3 requires charging.

The specific constructions of the arrangements 4, 8 and 11 are known, and since complete details thereof are not necessary to an understanding of the present invention, they will not be described in detail herein. However, the following brief description is given.

The circuit arrangement 4 constitutes a constant voltage battery charger with a maximum charge rate of 1.5 amperes, the output voltage being held to exactly 13.8 volts to prevent overvoltage damage. This is achieved by using a precision voltage regulator 25 (based on the LM317T) capable of an output between 1.2 and 37 volts, with its output voltage set at exactly 13.8 volts. The regulator 25 is attached to an 11°C/W heatsink for cooling purposes.

The circuit is fed via a toroidal transformer 26 having a secondary rating of 15 volts A.C. at 1.5 amperes which is rectified by a full wave bridge rectifier 27, consisting of four 1N5401 diodes. The resultant D.C. is smoothed by a 1000 micro-farad, 25 volt working electrolytic capacitor 28 of sufficient ripple rating for 1.5 amperes. A series diode 29 between the battery 3 and the charging circuit arrangement 4 prevents the regulator 25 taking current from the battery 3, and also acts as a safety feature to prevent any short-circuits within the charging circuit 4 discharging the battery.

The timing circuit 8 is based on a ZN1034E precision timer 30 and is arranged to give the battery a maximum of 10 hours charge. After 10 hours the diode 10 is illuminated indicating that the battery 3 is charge. At the same time the charging circuit 4 is switched off by the transistor switch 9.

The test circuit arrangement 11 is based on an LM339 comparator 31. If when switch 12 is pressed the battery voltage is below 11.5 volts then the diode 13 will illuminate, indicating that the battery 3 needs charging.

Figure 3:
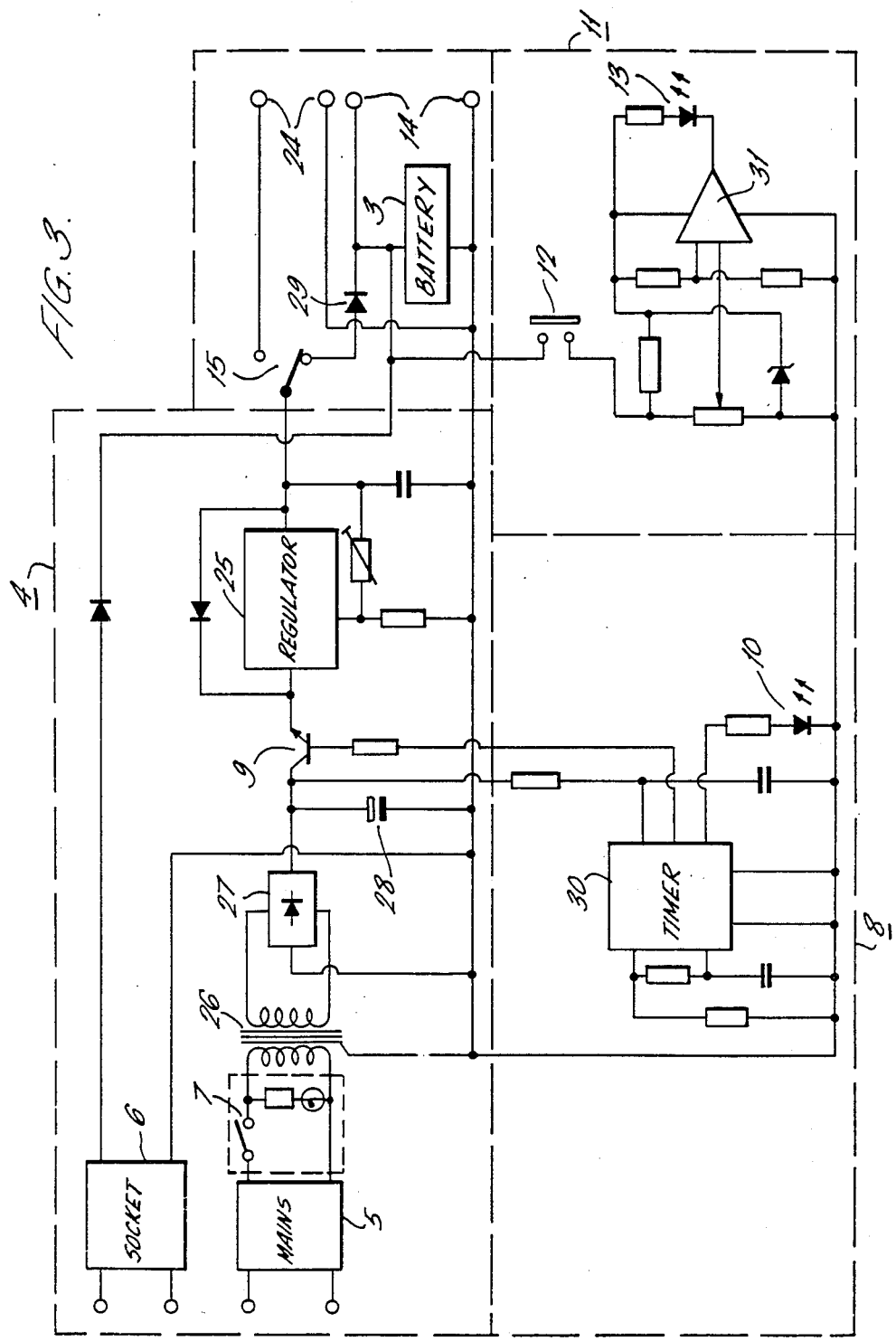
FIG. 3 is a circuit diagram of the power supply of FIGS. 1 and 2.

FIG. 3 shows the battery 3 connected to power output terminals 14. A switch 15 (see also FIG. 1) accessible to the outside of the housing 1, is operable either to connect the battery charger circuit arrangement 4 to the battery 3 to effect charging thereof, or to output terminals 24 (see FIG. 1) constituting charging circuit outlet means by way of which the arrangement 4 can be used to charge an external battery.

FIG. 1 also shows a further outlet in the form of a socket 16 for receiving a plug on an appliance to be powered by the power supply, and a lamp 17 mounted in the housing 1 and energisable by the battery 3 to provide illumination outside the housing 1.

FIG. 1 shows the power supply positioned over a battery 100 to be augmented, this battery 100 having a pair of terminal posts 101 to be connected to the output terminals 14 of the power supply.

Batteries came in various sizes and thus with different spacings between their terminal posts 101. To enable the power supply to be used with many different size batteries the power output means 14 comprises a pair of arms 18 pivotally mounted on the housing 1, the arms 18 being resiliently biased by springs 19 arranged at their pivots 20, towards each other and into rest positions engaged with the housing 1 as shown in FIG. 1 and in solid line in FIG. 2.

Figure 2:
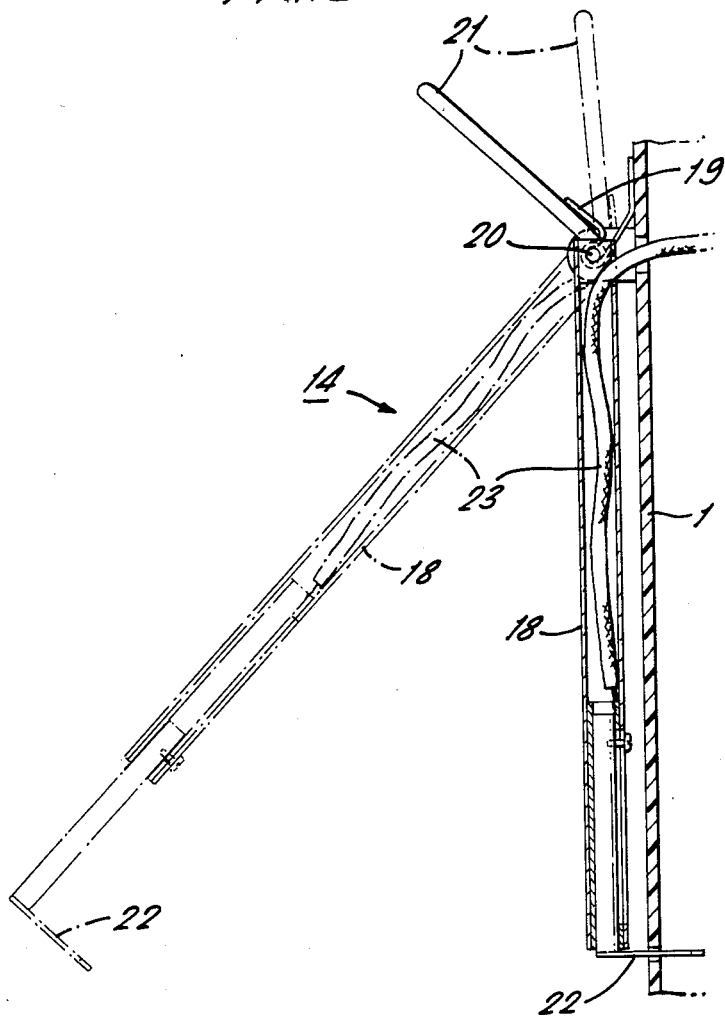
FIG. 2 is a diagrammatic sectional view of a power output arm of the power supply of FIG. 1.

The arms 18 have handle members 21 by which they can be urged out of their rest positions into splayed positions as shown in chain dash line for one arm in FIG. 2.

Each arm 18 is telescopic and carries at its free end a serrated contact member 22 adapted to bite into a terminal post 101. The contact members 22 are connected by way of the arms 18 and respective conductors 23 to the output terminals 14 shown in FIG. 3. With power output means 14 as described above the power supply can be directly mounted on a battery 100 to be augmented by opening out the arms 18 and extending them as necessary, and then engaging the contact members 22 with opposite, outward sides of the terminal posts 101 of the battery, the resilient bias of the arms 18 then serving to maintain the required electrical connections between the power supply and the battery 100.

I claim:

1. An electrical power supply, for use in augmenting the supply provided by a battery of an automobile having an electric starting motor, at the time of starting the automobile, comprising a housing; a battery mounted in the housing; a battery charger circuit arrangement mounted in the housing and connectable to the battery in the housing to affect charging thereof; power input means accessible to the exterior of the housing and by way of which electrical power can be supplied to the battery charger circuit arrangement; and power output means comprising a pair of arms pivotally mounted on the housing that are resiliently biased relative to each other whereby they can grip respective terminal posts of the automobile battery by engagement with opposite sides of respective terminal posts, by which arms the battery in the housing can be connected to the battery of an automobile to augment the power thereof.

2. A power supply as claimed in claim 1, in which the arms are of variable length whereby they can engage the terminal posts of automobile batteries having terminal posts spaced from each other by distances within a predetermined range of distances.

3. A power supply as claimed in claim 1, in which each arm carries at its free end a serrated member adapted to bite into a terminal post of an automobile battery.

4. A power supply as claimed in claim 1, in which the power input means comprises a mains supply connection means, and separate means to connect to an electrical power outlet of an automobile.

5. A power supply as claimed in claim 1, in which the housing carries a lamp energisable by the battery in the housing and arranged to provide illumination outside the housing.

6. A power supply as claimed in claim 1, including test means to indicate the state of charge of the battery in the housing.

7. A power supply as claimed in claim 6, in which the test means comprises a test switch accessible outside the housing, and an associated lamp.

8. A power supply as claimed in claim 1, including a timer circuit arrangement arranged to disconnect the battery charger circuit arrangement from the power input means a predetermined time after initiation of operation of the battery charger circuit arrangement.

9. A power supply as claimed in claim 8, including means to indicate the state of operation of the battery charger circuit arrangement.

10. An electrical power supply, for use in augmenting the supply provided by a battery of an automobile having an electric starter motor, at the time of starting the automobile, comprising a housing; a battery mounted in the housing; a battery charger circuit arrangement mounted in the housing and having an output connectible to the battery in the housing to effect charging thereof; power input means accessible to the exterior of the housing and by way of which electrical power can be supplied to the battery charger circuit arrangement; power output means by which the battery in the housing can be connected to the battery of an automobile to augment the power thereof; a charging outlet means; and switch means by which output of the battery charger circuit arrangement is selectively connectible to the battery in the housing or to a charging outlet means by way of which the battery charger circuit arrangement can be used to charge a battery outside the housing.

11. A power supply as claimed in claim 10, in which the switch means is also selectively operable to connect the battery in the housing to the power output means.

12. An electrical power supply, for use in augmenting the supply provided by a battery of an automobile having an electric starter motor, at the time of starting the automobile, comprising a housing; a single battery mounted in the housing; a battery charger circuit arrangement mounted in the housing and connectible to the battery in the housing to effect charging thereof; power input means accessible to the exterior of the housing and by way of which electrical power can be supplied to the battery charger circuit arrangement; and power output means by which the battery in the housing can be connected to the battery of an automobile to augment the power thereof, the power output means comprising a pair of arms adapted and arranged to engage directly terminal posts of an automobile battery, the arms being pivotally mounted on the housing and resiliently biased relative to each other whereby they can grip respective terminal posts of the automobile battery by engagement with opposite sides of respective terminal posts.

13. A power supply as claimed in claim 12, in which the arms are of variable length whereby they can engage the terminal posts of automobile batteries having terminal posts spaced from each other by distances within a predetermined range of distances.

14. A power supply as claimed in claim 12, in which each arm carries at its free end a serrated member adapted to bite into a terminal post of an automobile battery.

15. A power supply as claimed in claim 13, in which each arm carried at its free end a serrated member adapted to bite into a terminal post of an automobile battery